Patented Sept. 8, 1931

1,822,848

UNITED STATES PATENT OFFICE

EARLE H. BARCLAY, OF BALTIMORE, MARYLAND, ASSIGNOR TO THE SILICA GEL CORPORATION, OF BALTIMORE, MARYLAND, A CORPORATION OF MARYLAND

METHOD OF PREPARING PLURAL GELS

No Drawing. Application filed October 21, 1929, Serial No. 401,366, and in Germany October 20, 1927.

This application which is a continuation in part of application, Serial No. 185,905, filed April 22, 1927, relates to gels comprising two or more colloidal oxides such as the oxides of aluminum or titanium and processes for preparing the same.

Hard, stable, highly porous adsorbent gels containing two or more colloidal oxides may be prepared by forming a solution containing two or more salts of metals capable of forming a metal oxide gel, and reacting such solution with an alkali. The proportions and concentrations of the solution containing the salts of two or more metals and the alkali employed should be such that the reaction mass is of an alkalinity just beyond neutrality, say about 0.005 N alkali. The metal salts which may be used in forming the solution are titanium tetrachloride, titanium sulphate, aluminum chloride, aluminum sulphate or aluminum nitrate. The alkali used may be either ammonium hydroxide, sodium hydroxide, or potassium hydroxide.

According to the present invention, for the preparation of a hard, highly porous gel comprising the oxides of both aluminum and titanium, a solution of titanium sulphate, for example, of 10% strength, is mixed with an equal portion of a solution of aluminum sulphate of like strength. The temperature is maintained at about −2° C., and one to two normal ammonium hydroxide solution is slowly added with stirring until the whole is slightly alkaline, that is until the alkalinity amounts to about 0.005 N.

In place of a solution of titanium sulphate of 10% strength, a solution of titanium tetrachloride of like strength may be used. Also, a solution of a salt of aluminum such as aluminum chloride or nitrate of 10% strength may be employed in place of the 10% solution of aluminum sulphate.

The jelly so obtained is separated from the mother liquor, and washed by decantation. The resulting jelly like mass is then dried at about 100° C. or a little thereabove, and thereafter subjected to a higher temperature, for instance 150° C. to 200° C. for two or three hours.

The washing, previously mentioned, may be effected at any point before, during or after, the drying, or at two or more of said points, but I prefer to wash the material before drying. Obviously the strengths of the solution used and the relative amounts thereof may be varied to produce mixed gels having different proportions of titanium and aluminum.

My products are plural metal oxide gels which are hard, stable, and highly porous, and capable of adsorbing water vapor to such an extent as to contain at least 21% of its weight (dry) of water when in equilibrium with water vapor at 30° C. and a partial pressure of 22 mm. of mercury.

Having thus described the invention, what is claimed as new and desired to be secured by Letters Patent is:

1. The process of preparing an adsorbent gel comprising titanium oxide and aluminum oxide, which comprises mixing titanium sulphate solution of 10% strength with an equal portion of a solution of aluminum sulphate of 10% strength, maintaining the temperature not higher than about 2° below 0° C., adding slowly with stirring a one to two normal ammonium hydroxide solution until the alkalinity of the mixture is about 0.005 N., drying the solid matter formed thereby and washing it at some stage of its preparation.

2. In the process of preparing an adsorbent gel comprising titanium oxide and aluminum oxide, the step of treating a solution containing a titanium salt and an aluminum salt with alkali to just beyond neutrality.

3. In the process of preparing an adsorbent gel comprising titanium oxide and aluminum oxide, the step of adding a solution of alkali gradually and with thorough stirring to a solution containing a titanium salt and an aluminum salt to just beyond neutrality.

4. In the process of preparing an adsorbent gel comprising titanium oxide and aluminum oxide, the step of adding ammonia gradually and with thorough stirring to a solution containing a titanium salt and an aluminum salt to just beyond neutrality.

5. In the process of preparing an adsorbent gel comprising titanium oxide and aluminum oxide, the step of treating a solution containing a titanium salt and an aluminum salt with alkali to just beyond neutrality and maintaining the reaction mass below 0° C. during such treatment.

6. In the process of preparing an adsorbent gel comprising titanium oxide and aluminum oxide, the step of adding a solution of alkali gradually and with thorough stirring to a solution containing a titanium salt and aluminum salt to just beyond neutrality and maintaining the reaction mass below 0° C. during such treatment.

7. In the process of preparing an adsorbent gel comprising titanium oxide and alunimum oxide, the step of adding a slight excess of an ammonia solution, gradually and with thorough stirring, to a solution containing a titanium salt and an aluminum salt while maintaining the reaction mass substantially at a temperature not above 0° C.

8. The process of preparing adsorbent gels containing several metal oxides, which comprises adding a solution of alkali, gradually and with thorough stirring, to a solution containing salts of said metals, while maintaining said solution at a temperature below 0° C., said alkali being added until the hydroxyl ion concentration amounts to about 0.005 N.

9. The process of preparing adsorbent gels containing several metal oxides, which comprises adding a solution of ammonia, gradually and with thorough stirring, to a solution containing salts of said metals, while maintaining said solution at a temperature below 0° C., said ammonia being added until the hydroxyl ion concentration amounts to about 0.005 N.

10. A hard, stable, highly porous gel comprising aluminum oxide and titanium oxide, and capable of adsorbing water vapor to such an extent as to contain at least 21% of its weight of water when in equilibrium with water vapor at 30° C. and a partial pressure of 22 mm. of mercury.

In testimony whereof I hereunto affix my signature.

EARLE H. BARCLAY.